(12) United States Patent
Bonjour et al.

(10) Patent No.: US 8,271,405 B2
(45) Date of Patent: Sep. 18, 2012

(54) MANAGEMENT OF APPLICATIVE STREAMS IN MOBILE NETWORKS

(75) Inventors: Servane Bonjour, Acigné (FR); Karine Guillouard, Chantepie (FR); Lucian Suciu, Cesson-Sevigné (FR)

(73) Assignee: France Telecom, Paris (FR)

( * ) Notice: Subject to any disclaimer, the term of this patent is extended or adjusted under 35 U.S.C. 154(b) by 1006 days.

(21) Appl. No.: 12/297,463

(22) PCT Filed: Apr. 17, 2007

(86) PCT No.: PCT/FR2007/051120
§ 371 (c)(1),
(2), (4) Date: Oct. 17, 2008

(87) PCT Pub. No.: WO2007/119024
PCT Pub. Date: Oct. 25, 2007

(65) Prior Publication Data
US 2009/0106175 A1 Apr. 23, 2009

(30) Foreign Application Priority Data
Apr. 18, 2006 (FR) ...................................... 06 03411

(51) Int. Cl.
*G06N 5/00* (2006.01)
(52) U.S. Cl. .......................................... 706/12; 706/45
(58) Field of Classification Search ..................... 706/12, 706/45
See application file for complete search history.

(56) References Cited

U.S. PATENT DOCUMENTS

| | | | |
|---|---|---|---|
| 6,088,804 A * | 7/2000 | Hill et al. ........................ | 726/25 |
| 6,651,101 B1 | 11/2003 | Gai et al. | |
| 6,718,380 B1 | 4/2004 | Mohaban et al. | |
| 2002/0133586 A1 * | 9/2002 | Shanklin et al. .............. | 709/224 |
| 2004/0223602 A1 | 11/2004 | Honkasalo et al. | |
| 2009/0119392 A1 | 5/2009 | Bonjour et al. | |

FOREIGN PATENT DOCUMENTS
EP 1458148 A1 9/2004

OTHER PUBLICATIONS

R. Braden et al., RFC 2205: Resource Reservation Protocol, Request for Comments—Online—pp. 1-70—Sep. 1997.
D. Durham et al., RFC 2748: the COPS (Common Open Policy Service) Protocal, Request for Comments—Online—pp. 1-32—Jan. 2000.
T. Hosfeld et al., "Supporting Vertical Handover by Using a Pastry Peer-to-Peer Overlay Network", Universite de Wurtzburg—Rapport Technique n 367, Sep. 2005.
P. Magnusson et al., "Radio Resource Management Distribution in a Beyond 3G Multi-Radio Access Architecture", IEEE GLOBECOM'04.

(Continued)

*Primary Examiner* — Wilbert L Starks
(74) *Attorney, Agent, or Firm* — David D. Brush; Westman, Champlin & Kelly, P.A.

(57) ABSTRACT

A method is provided for constructing at least one decision graph for managing at least one applicative stream assigned to a terminal and set up between the terminal and a correspondent via at least one communication network. The method includes a step of dynamically constructing at least one possible decision graph for the one applicative stream assigned to the terminal, itself including a step of exchanging at least one configuration message between at least two decision modules pertaining to a predetermined set of decision modules.

20 Claims, 11 Drawing Sheets

OTHER PUBLICATIONS

H. Soliman et al., "Hierarchical Mobile IPv6 Mobility Management (HMIPv6)", IETF RFC 4140.

K. Guillouard et al., "Network-Controlled Mobility within Radio Access Networks Based on WLAN Technologies", Annales des Telecommunications, 3, 58, Mar. 2003.

J. Xie et al., "A Distribution Dynamic Regional Location Management Scheme for Mobile IP", in proc. IEEE INFOCOM, 2004.

French Search Report of foreign counterpart Application No. FR0603411, filed Apr. 18, 2006.

English Translation of the Written Opinion of foreign counterpart Application No. PCT/FR2007/051120, filed on Apr. 17, 2007.

W. Ma et al., "Dynamic Hierarchical Mobility Management Strategy for Mobile IP Networks," IEEE Journal on Selected Areas in Communications, vol. 22, No. 4, May 2004.

* cited by examiner

MANAGEMENT OF APPLICATIVE STREAMS IN MOBILE NETWORKS

CROSS-REFERENCE TO RELATED APPLICATIONS

This Application is a Section 371 National Stage Application of International Application No. PCT/FR2007/051120, filed Apr. 17, 2007 and published as WO 2007/119024 on Oct. 25, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of decision graphs. More specifically, the disclosure relates to a technique for building decision graphs for the management of applicative streams assigned to terminals, each applicative stream being set up between a terminal and a correspondent (i.e. an apparatus with which the terminal communicates), through at least one communication network.

BACKGROUND OF THE DISCLOSURE

We shall now briefly present a few techniques of the prior art along with their respective drawbacks.

1) Vertical Handover Using a Distributed Approach

A first prior art technique is described in Tobias Hosfeld et al.

"Supporting Vertical Handover by Using a Pastry Peer-to-Peer Overlay Network", University of Würtzburg—Technical Report number 367, September 2005.

In this approach, the radio measurements (power of the received signal, block error rate etc) are distributed dynamically between the attachment points situated in a same decision zone. On the basis of these measurements, an access point deduces the radio conditions of its neighbors but only for the same technology as itself. To obtain measurements pertaining to the other technologies, links between the access points are set up by hand. The handover decision is always taken either by the terminal or by the current attachment point.

In this approach, there are no dynamic decision graphs, and only some decision parameters are dynamically distributed. This therefore cannot be used to adapt the decision to the applications and to the terminals.

2) Management of Multi-Access Radio Resources (GRRM)

A second prior art technique is described in: P. Magnussen, J. Lundsjo, J. Sachs and P. Wallentin, "Radio Resource Management Distribution in a Beyond 3G Multi-Radio Architecture", IEEE GLOBECOM'04.

This approach proposes to centralize certain GRRM functions, such as load sharing, and to distribute other functions such as handover. The mobile terminal can form part of the distribution. In both cases, a specific node takes responsibility for a set of cells of a same technology. Thus, in the centralized approach, a multi-techno central node co-ordinates several mono-techno nodes which may be based on different technologies.

In this approach, a sort of decision graph is built but it is identical for all the applications and all the terminals under the co-ordination of a neighbouring management node. The same problem is found as in the case of the first known technique.

3) HMIP (Hierarchical Mobile IP) and NC-HMIP (Network Controlled Hierarchical Mobile IP)

A third prior art technique is described in the following documents:

H. Soliman et al., "Hierarchical Mobile IPv6 Mobility Management (HMIPv6)", IETF RFC 4140; and K. Guillouard et al., "Network-controlled Mobility within Radio Access Networks Based one WLAN Technologies", Annales des Télécommunications, 3, 58, March 2003.

These two approaches enable the dynamic construction of a handover execution graph. A handover execution graph is represented by the set of entities taking part in the execution of the handover. In the proposed approaches, this execution is done at the IP level by extension of the Mobile IPv6 protocol. The handover execution graph is formed by entities such as: mobile terminal, access point, mobile anchorage point (MAP) and home agent (which is the special node responsible for tracking the position of the mobile terminal during its movements).

In this third prior art technique, there is no decision graph but a handover execution graph (see the definitions of these two types of graph here above). Furthermore, the built network is common to all the applications and to all the terminals under coverage of a same access router). Nor is there any dialogue between the different entities of the network for the building of this graph. Either it is the terminal alone that decides on the decision graph (HMIPv6) or it is a centralized node of the network (NC-HMIPv6). Thus, the same drawback is found as in the case of the first and second known techniques.

SUMMARY

One particular embodiment of the invention proposes a method for building at least one decision graph for the management of at least one applicative stream assigned to a terminal and set up between said terminal and a correspondent through at least one communications network. Said method comprises a step for the dynamic building of at least one possible decision graph for said at least one applicative stream assigned to said terminal itself, comprising a step for exchanging at least one configuration message between at least two decision modules belonging to a determined set of decision modules.

The general principle of an embodiment of the invention therefore is that of a mechanism that can be iterated several times, in which a decision module sends a configuration message to another (intermediate) decision module by which it informs this other decision module about the other decision modules with which it can itself exchange information. The configuration message or messages are sent before the starting of the stream, at the starting of the stream and even during the stream.

Thus, an embodiment of the invention enables the dynamic building of possible decision graphs by configuration messages. As described in detail here below, once these possible decision graphs are built, it is possible to dynamically build an active decision graph by exchanging one or more decision messages between the decision modules, in keeping with the configuration created by the configuration messages. The active decision graph is necessarily one of the possible decision graphs.

Advantageously, each configuration message comprises the following fields:
- a field containing an identifier of the decision module that is the source of said configuration message;
- a field containing an identifier of the decision module that is the recipient of said configuration message;
- a field containing an identifier of at least said terminal, for which said configuration message can be applied;
- a field containing at least one distribution structure.

Advantageously, each configuration message furthermore comprises a field containing an identifier of said at least one applicative stream assigned to the terminal.

In one particular embodiment of the invention, each configuration message is specific to a terminal and to an applicative stream.

Advantageously, each distribution structure comprises the following fields:
- a field containing an identifier of a third-party decision module, distinct from said recipient decision module;
- a field containing a role of said third-party decision module;
- a field containing a character of a distribution method to be used between the recipient decision module and said third-party decision module;
- a field containing a character of a decision method to be used by the recipient decision module.

It must be noted that the third-party decision module may be indistinguishable from the source decision module.

According to one advantageous characteristic, each distribution structure furthermore comprises at least one additional field belonging to the group comprising:
- a field containing a supported granularity;
- a field containing a distribution method to be used between the recipient decision module and said third-party decision module;
- a field containing at least one parameter defining said distribution method;
- a field containing a decision method to be used by the recipient decision module;
- a field containing at least one parameter defining said decision method.

Advantageously, each configuration message furthermore comprises an additional field containing at least one trigger structure for triggering a decision method to be used by the recipient decision module.

According to one advantageous characteristic, each trigger structure comprises the following fields:
- a field containing an identifier of a given trigger;
- a field containing an identifier of the decision module containing the given trigger.

In one advantageous embodiment of the invention, each configuration message furthermore comprises an additional field containing at least one structure of decision parameters to be used by the recipient decision module, each structure of parameters comprising the following fields:
- a field containing an identifier of a given parameter;
- a field containing an identifier of the decision module containing the given parameter;
- a field containing an identifier of the decision module that is the recipient of the given parameter;
- a field containing a frequency of sending the given parameter.

Advantageously, said method furthermore comprises a step of dynamic building of a single active decision graph for said at least one applicative stream assigned to said terminal, itself comprising a step of exchanging at least one decision message between at least two decision modules, in complying with a configuration preliminarily created by the step of dynamic building of at least one possible decision graph, said single active decision graph being the possible decision graph or one of the possible decision graphs preliminarily built for said at least one applicative stream.

Thus, depending on the parameters available to it, a decision module sends a partial or final decision message to another decision module, in complying with the configuration created by the configuration messages.

Advantageously, each decision message comprises the following fields:
- a field containing an identifier of the decision module that is the source of said decision message;
- a field containing an identifier of the decision module that is the recipient of said decision message;
- a field containing a type of decision that is partial or final;
- a field containing an identifier of at least said terminal, for which said decision message is applied;
- a field containing a decision.

Advantageously, each decision message furthermore comprises a field containing an identifier of said at least one applicative stream assigned to the terminal.

In a particular embodiment of the invention, each decision message is specific to a terminal and an applicative stream.

Thus, in this particular embodiment, the solution proposed by the invention consists of the dynamic creation of an active mobility decision graph for each application of each user. Indeed, with the growing complexity of the network architectures implementing several types of access networks or even several operators, the taking of a decision to pass from one access network to another can be optimal only if it is defined dynamically for each application of a user. Indeed, depending on the characteristics of the application, the power to decide on mobility does not necessarily reside in the same entity or entities (network or terminal). Similarly, depending on the policies set up by the different operators, the same decision will not be distributed or hierarchized (i.e. hierarchically organised) in the same way. Finally, the parameters that enter into the decision making can also depend on the application, the user and/or the structure of the network. The solution proposed defines the mechanisms needed for the dynamic construction of such active decision graphs.

According to an advantageous characteristic, the method furthermore comprises a preliminary step for obtaining a general decision graph comprising said determined set of decision modules from among which the decision modules exchanging the configuration messages are chosen.

In one particular embodiment of the invention, said determined set of decision modules belongs to a network architecture that is:
- distributed because at least two decision modules belong to a same hierarchical level of said architecture and/or
- hierarchized because at least two decision modules belong to two distinct hierarchical levels of said architecture.

Advantageously, the management of said at least one applicative stream assigned to said terminal belongs to the group comprising:
- mobility management;
- management of distribution of quality of services resources.

In another embodiment, the invention relates to a communications equipment comprising a decision module, said apparatus comprising first means for exchanging, enabling the exchange of at least one configuration message with at least one other decision module belonging to a determined set of decision modules, so as to participate in the dynamic building of at least one possible decision graph for the management of at least one applicative stream assigned to a terminal and set up between said terminal and one correspondent through at least one communications network.

Advantageously, said communications apparatus furthermore comprises second means for exchanging, enabling the exchange of at least one decision message with at least one other decision module belonging to said determined set of decision modules, in keeping with at least one possible predetermined decision graph, so as to participate in the dynamic building of a single active decision graph for said at least one dedicated stream assigned to said terminal.

Advantageously, said communications apparatus belongs to the group comprising: said terminal, said correspondent and said entities of said at least one communications network.

More generally, the communications apparatus of an embodiment of the invention comprises means for implementing the method for building at least one decision graph as described here above (in any of its different embodiments).

In another embodiment, the invention relates to a computer program product downloadable from a communications network and/or recorded on a computer-readable carrier and/or executable by a processor, said computer program product comprising program code instructions for the execution of the steps of the above-mentioned method for building at least one decision graph for the management of at least one applicative stream assigned to a terminal, when said program is executed on a computer.

In another embodiment, the invention relates to a signal exchanged between a source decision module and a recipient decision module, in the context of the dynamic building of at least one possible decision graph for the management of at least one applicative stream assigned to a terminal and set up between said terminal and one correspondent through at least one communications network, said signal carrying a configuration message comprising:

a field containing an identifier of said decision module that is the source of said configuration message;
  a field containing an identifier of said decision module that is the recipient of said configuration message;
  a field containing an identifier of at least said terminal, for which said configuration message is applied;
  a field containing at least one distribution structure.

Advantageously, each configuration message furthermore comprises a field containing an identifier of said at least one applicative stream assigned to the terminal. In a particular embodiment of the invention, each configuration message is specific to a terminal and to an applicative stream.

In another embodiment, the invention relates to a signal exchanged between a source decision module and a recipient decision module, in the context of the dynamic building of a single active decision graph for the management of at least one applicative stream assigned to a terminal and set up between said terminal and one correspondent through at least one communications network, said signal carrying a decision message comprising:

a field containing an identifier of said decision module that is the source of said configuration message;
  a field containing an identifier of said decision module that is the recipient of said configuration message;
  a field containing a type of decision that is partial or final;
  a field containing an identifier of at least said terminal, for which said configuration message is applicable;
  a field containing at least one distribution structure.

Advantageously, each decision message furthermore comprises a field containing an identifier of said at least one applicative stream assigned to the terminal. In one particular embodiment of the invention, each decision message is specific to a terminal and to an applicative stream.

BRIEF DESCRIPTION OF THE DRAWINGS

Other characteristics and advantages of embodiments of the invention shall appear from the following description of a preferred embodiment of the invention, given by way of an indicative and non-exhaustive example (not all the embodiments of the invention are limited to the characteristics and advantages of this preferred embodiment), and from the appended drawings, of which.

DETAILED DESCRIPTION OF ILLUSTRATIVE EMBODIMENTS

Figure 1:
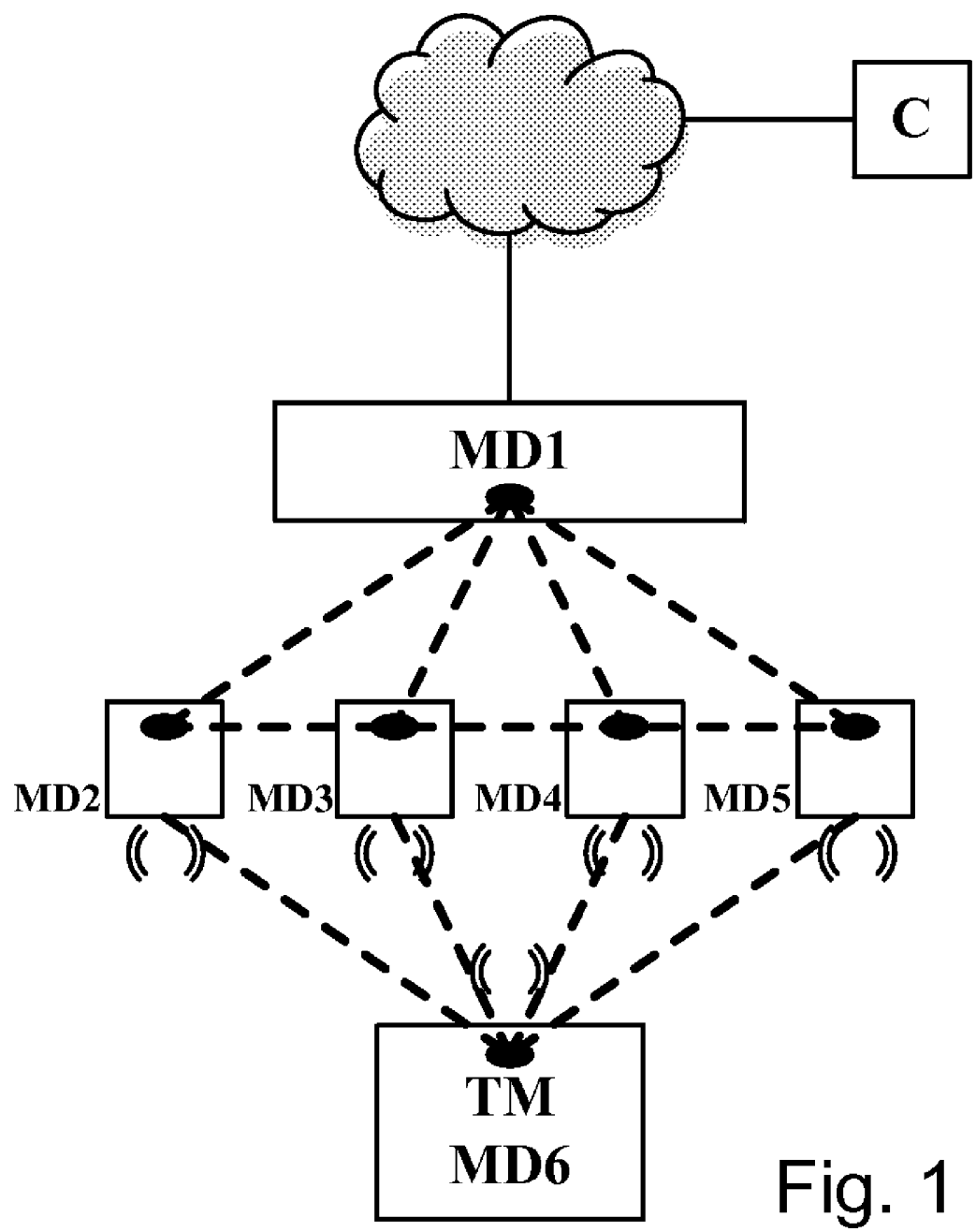
FIG. 1 shows an example of a general decision graph according to an embodiment of the invention, for a single terminal.

Here below in the description, it is assumed that a user uses one or more applications (for example an email application or a video-on-demand application) through a terminal at his disposal and that a distinct applicative stream is set up with the user's terminal for each of these applications. In other words, the notions of terminal and terminal user are deliberately made indistinguishable.

An embodiment of the invention can be applied especially but not exclusively to the implementing of a service for the mobility of terminals between access networks (in the management of inter-cell handovers).

It can also be applied to other types of decision such as for example the distribution of quality of service resources (bandwidth for example). In this case, the decision is one of reservation, for a stream, of a particular class of service.

In the particular case of a mobility service, an embodiment of the invention promotes co-operation between the access networks enabling the offer of a mobility service between the operator's different networks using different technologies but also other operators. Indeed, in the context of the deployment of a mobility service between heterogeneous access networks, it is vital that the operator should retain control over the mobility of the terminals. Now it is also important that mobility should be adapted to the best possible extent to each application of each terminal in order to ensure quality of service that will win the users' full backing. Thus, a compromise must be found between efficient mobility and a limitation of the information exchanged between the different elements of the network managing the mobility (including the terminal). An embodiment of the invention is directed towards this compromise since it makes it possible to limit the number of parameters exchanged (by taking account of them locally and being constantly adapted to applications and to users) while at the same time enabling efficient mobility (through the relevance of the information used to anticipate mobility).

An embodiment of the invention can be applied in every type of data network and is independent of the technology of access networks (GPRS or General Packet Radio Service, UMTS or Universal Mobile Telecommunication System, WLAN or Wireless Local Area Network, Ethernet etc).

The present description uses the following classic definitions:
  "decision graph": this represents a set of decision modules and their relationships (for example PDP or Policy Decision Point module of the IMS (IP Multi-media Subsystem)). Each decision module executes a decision-making algorithm;
  "decision tree": this is the description of decisions in a form of a tree whose elements are the parameters to be evaluated and whose leaves are the decisions;
  "execution graph": this represents a set of execution modules taking part in the execution of a decision as well as their relationships (for example IP Mobile, Home Agent, Foreign Agent and the terminal). Each execution module takes part in the implementation of a decision.

In all the figures of the present document, the identical elements and steps are designated by a same numerical reference.

1) IDENTIFICATIONS OF ESSENTIAL TECHNICAL ELEMENTS OF A PARTICULAR EMBODIMENT OF THE INVENTION

It is assumed as a preliminary that the different decision modules know one another and are capable of exchanging messages with one another by known communications means.

A possible application described here below is that of decision making on mobility of the streams of a user.

The essential elements characterizing a particular embodiment of the invention relative to the prior art are described here below.

FIG. 1 represents a decision architecture comprising six decision modules (here below sometimes called MD) MD1 to MD6. MD6 is situated in the user's mobile terminal (called TM here below). A correspondent C may also contain a decision module. It is assumed that the decision modules, the mobile terminal and the correspondent are connected to one another by communication means enabling them to exchange messages. One or more applicative streams are set up between the mobile terminal and the correspondent.

Figure 2:
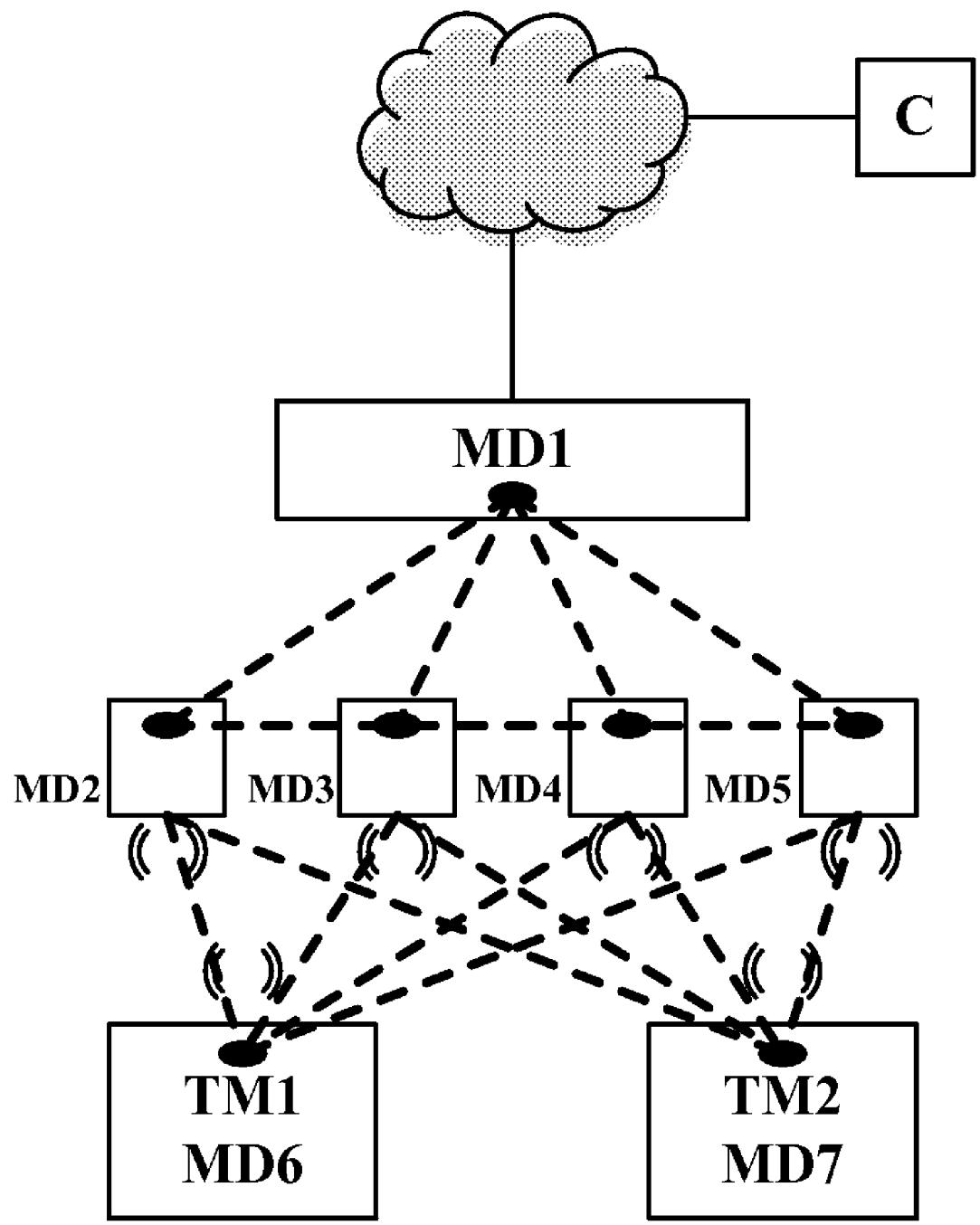
FIG. 2 shows an example of a general decision graph according to an embodiment of the invention for two terminals.

It is assumed that the general decision graph is known beforehand. An example of representation of a general decision graph of this kind is shown in FIG. 1 in the case of a single terminal TM. Another example of a representation is given in FIG. 2, in the case of two terminals TM1 and TM2. This general decision graph consists of the set of decision modules and links (shown in dotted lines) that connect them.

The configuration messages exchanged between the decision modules are used to define the possible decision graphs for each stream or group of streams of a user.

Figure 3:
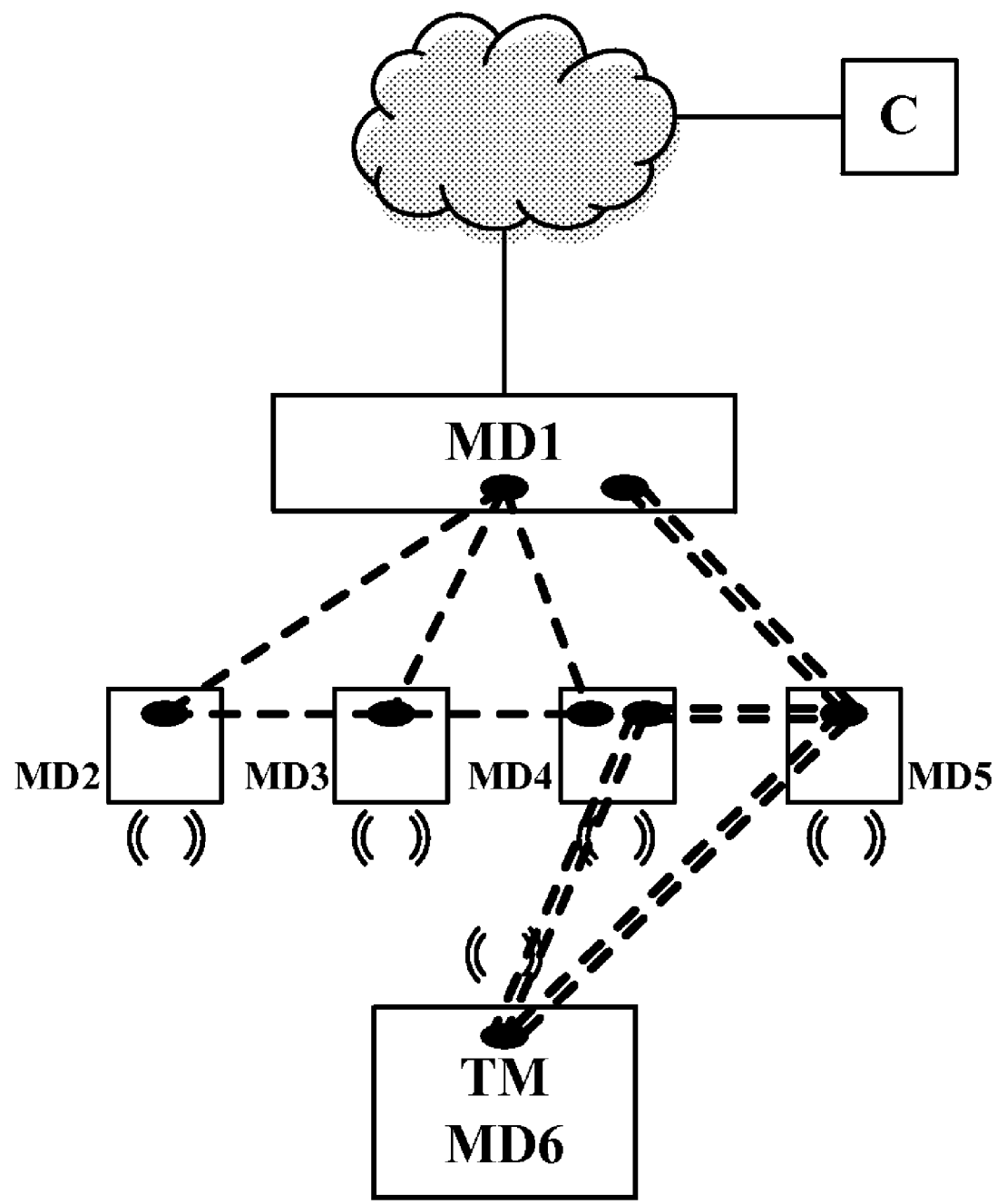
FIG. 3 shows an example of possible decision graphs according to an embodiment of the invention for two streams towards only one terminal.

An example of a depiction of possible decision graphs is given in FIG. 3 in the case of a terminal TM and two streams. The possible decision graphs for the first stream are shown in simple dashes and involve decision modules referenced MD1, MD2, MD3 and MD4. The possible decision graphs for the second stream are shown in double dotted lines and involve the decision modules referenced MD1, MD4, MD5 and MD6.

Figure 4:
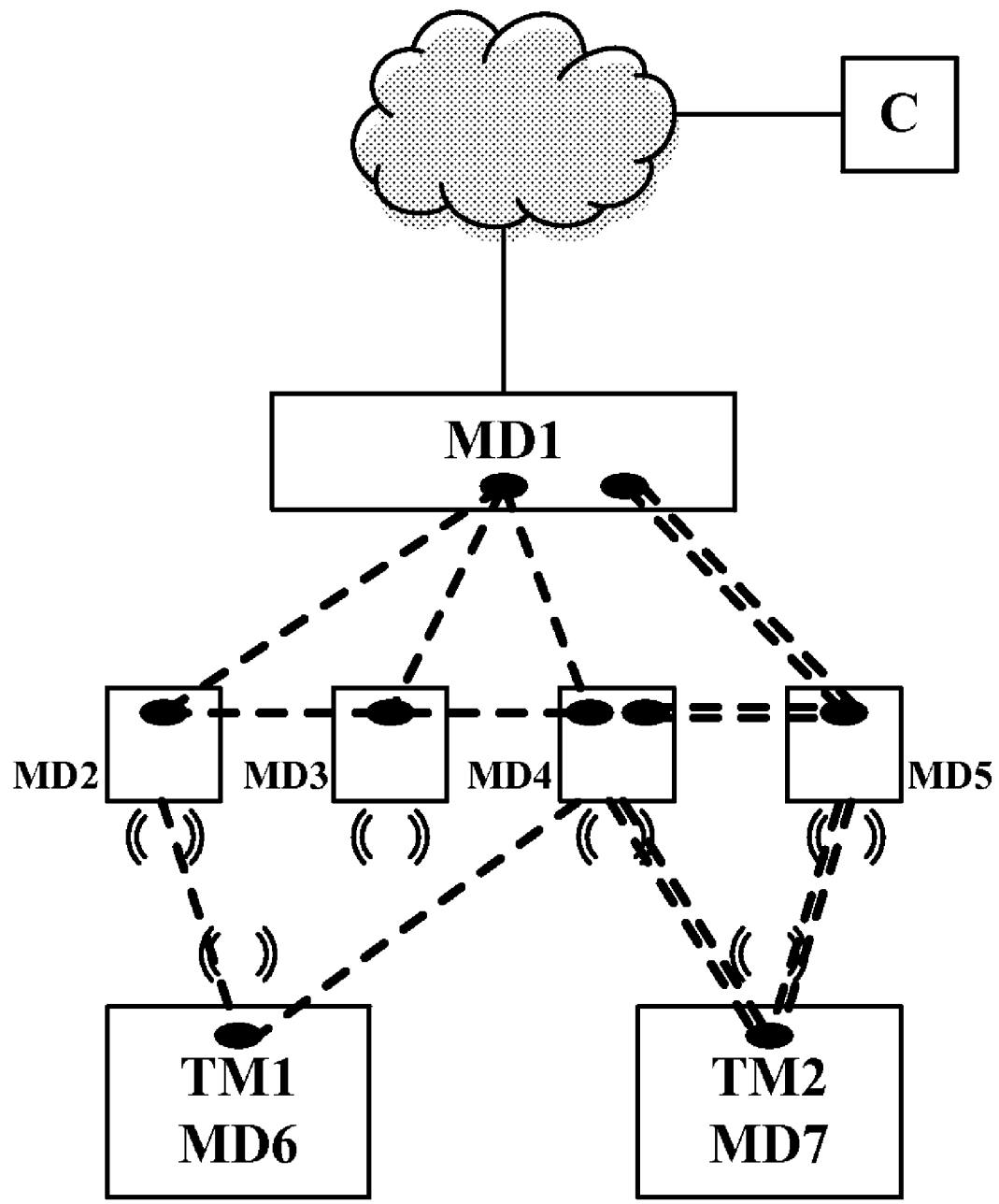
FIG. 4 shows an example of possible decision graphs according to an embodiment of the invention for two streams each towards a distinct terminal.

Another example of a representation of possible decision graphs is given in FIG. 4, in the case of two terminals TM1 and TM2, and two streams. The possible decision graphs for the first stream towards the first terminal TM1 are shown in single dotted lines and involve the decision modules referenced MD1, MD2, MD3, MD4 and MD6. The possible decision graphs for the second stream towards the second terminal TM2 are shown in double dotted lines and involve the decision modules referenced MD1, MD4, MD5 and MD7.

It must be noted that when a decision module MD accepts a configuration message, it obligatorily forms part of the possible decision graphs. On the contrary, the methods of distribution and decision indicated in the configuration messages are not necessarily obligatory. This depends on the "character" field conveyed by the configuration messages.

Figure 12:
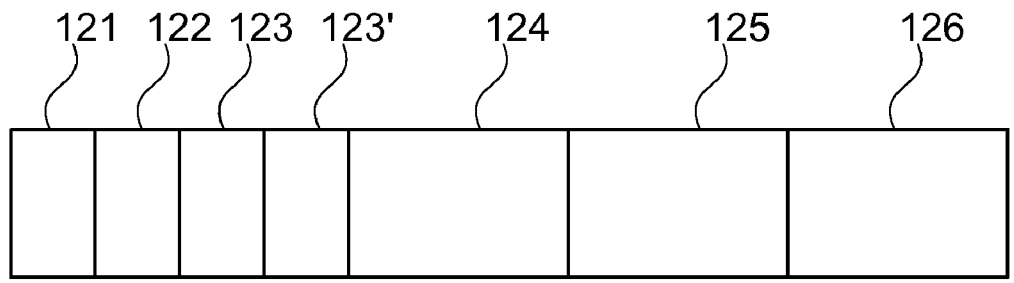
FIG. 12 shows the structure of a configuration message according to a particular embodiment of the invention.

As illustrated in FIG. 12, in a particular embodiment of the invention, the configuration messages contain at least the following fields:
  a field 121 containing an address of the source MD of the message (IP address for example);
  a field 122 containing an address of the destination MD of the message (IP address for example);
  a field 123 containing an identifier of the user, for which the graphs apply; and optionally a field 123' containing an identifier of the stream associated with the user and for which the graphs apply. If this latter field 123' is not present, the graphs apply by default to all the streams associated with the user;
  a field 124 containing one or more distribution structures each containing at least following fields:
    the address or identifier of a third-party decision module (IP address . . . );
    the role of the third-party MD; hierarchical or even parity (of a same level);
    the character of the distribution method: obligatory, suggested or "default";

the character of the decision method: obligatory, suggested or "default".

It must be noted that the user identifier may represent a group of users. Similarly, the stream identifier may represent a set of streams and even a terminal.

The configuration messages may also contain the following optional fields:

for each distribution structure:
- a field containing a supported granularity (per stream, per application, per user etc);
- a field containing the method of distribution to be used between the destination MD and a third-party MD (conflict free, enforced team etc);
- a field containing the parameters defining the method of distribution (weights of the goals for example);
- a field containing the decision method to be used by the destination MD (fuzzy logic, utility function etc);
- a field containing the parameters defining the decision method (utility function, coefficient of the utility function etc);

a field 125 containing one or more structures of triggers of the decision method each containing the following fields:
- a field containing the name of the trigger (cf appendix 2);
- a field containing the address of the module containing this trigger;

a field 126 containing one or more structures of decision parameters, each containing the following fields:
- a field containing the name of the parameter (cf. appendix 2);
- a field containing the address of the module containing this parameter;
- a field containing the address of the module that is the recipient of the parameter;
- a field containing a frequency for sending the parameter.

Once the configuration of the decision modules has been done, i.e. after all the possible decision graphs have been set up for a stream and a given user, the active decision graph is built dynamically by exchange of the decision messages (partial or final) according to needs (for example, during a congestion of a access network, or following a shift on the part of the user). The decision modules can be reconfigured at any time.

Figure 5:
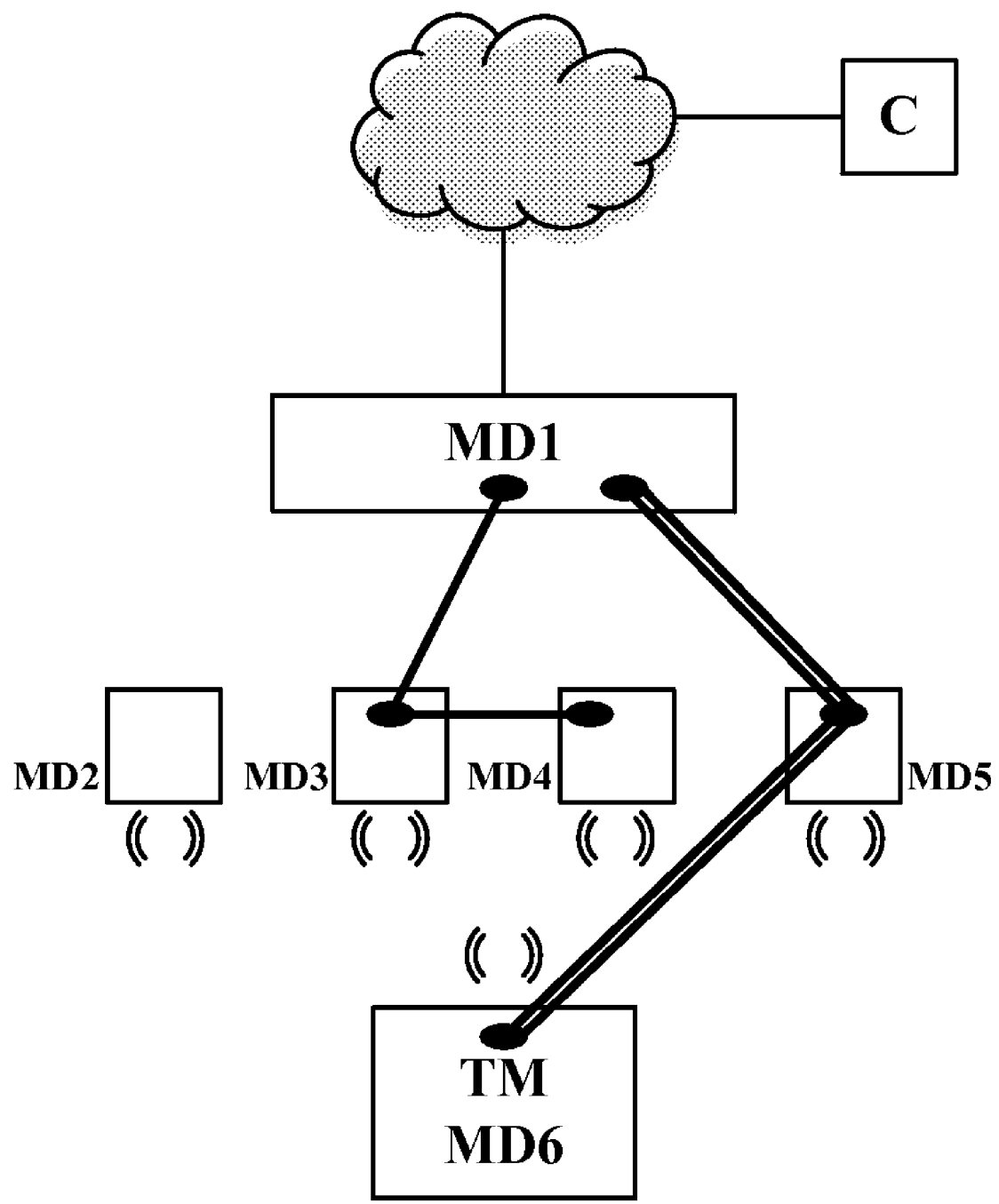
FIG. 5 shows an example of active decision graphs according to an embodiment of the invention, for two streams towards only one terminal.

FIG. 5 gives an example of active decision graphs in the case of a terminal TM and two streams. The active decision graph for the first stream is represented in a single dotted line and involves decision modules referenced MD1, MD3 and MD4. The active decision graph for the second stream is shown in a double dotted line and involves decision modules referenced MD1, MD5 and MD6.

Figure 6:
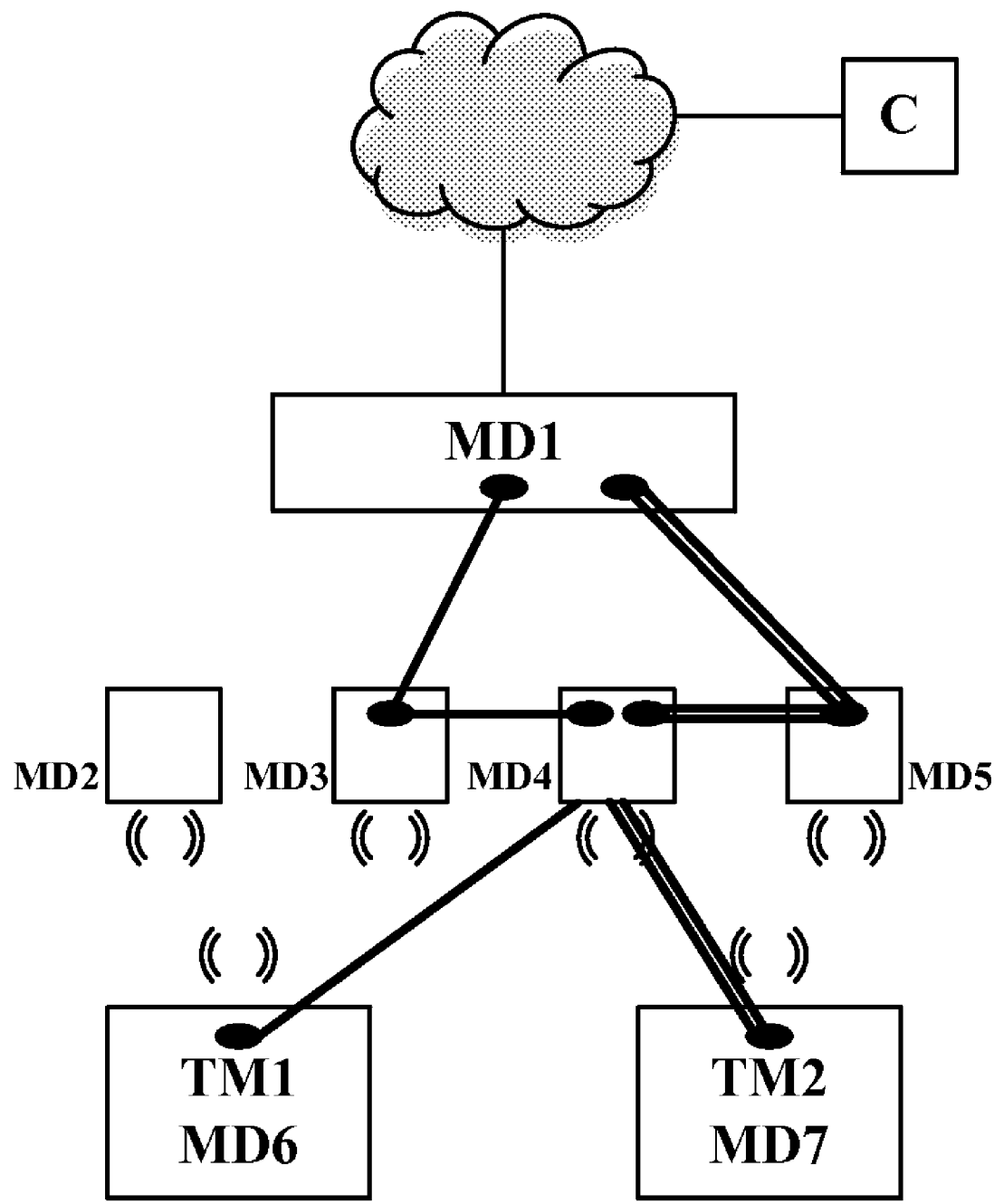
FIG. 6 shows an example of active decision graphs according to an embodiment of the invention, for two streams each towards a distinct terminal.

FIG. 6 shows an example of a decision graph that is active in the case of two terminals TM1 and TM2 and two streams. The active decision graph for the first stream towards the first terminal TM1 is shown in a single dotted line and involves the decision modules referenced MD1, MD3, MD4 and MD6. The active decision graph for the second stream towards the second terminal TM2 is shown in a double dotted line and involves the decision modules referenced MD1, MD4, MD5 and MD7.

Figure 13:
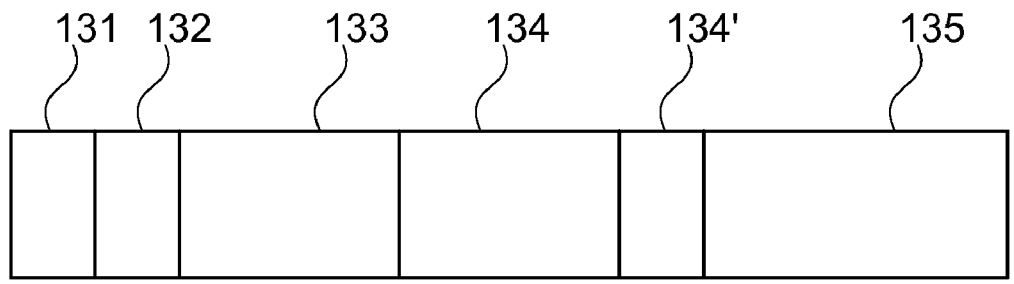
FIG. 13 shows the structure of a decision message according to a particular embodiment of the invention.

As illustrated in FIG. 13, in one particular embodiment of the invention, the decision messages contain at least the following fields:
- a field 131 containing an address of the source MD of the message (IP address for example);
- a field 132 containing an address of the destination MD of the message (IP address for example);
- a field 133 containing the type of decision (partial or final decision);
- a field 134 containing an identifier of the user, for which the decision is applied;
- and optionally a field 134' containing an identifier of the stream associated with the user and for which the decision can be applied. If this latter field 134' is not present, the decision can be applied by default to all the streams associated with the user;
- a field 135 containing a decision (for example a decision of final handover towards a particular access point, or a decision of partial handover towards a particular access network).

It must be noted that the user identifier may represent a group of users. Similarly, the stream identifier may represent a set of streams.

In short, an embodiment of the invention enables the following:
- the dynamic construction of possible decision graphs by configuration messages (even parity decision modules, parameters to be exchanged between the modules, parameters to be evaluated, location of its parameters);
- the dynamic construction of the active decision graphs by exchange of partial decision messages between the decision modules, an active graph is necessarily one of the possible graphs.

Figure 7:
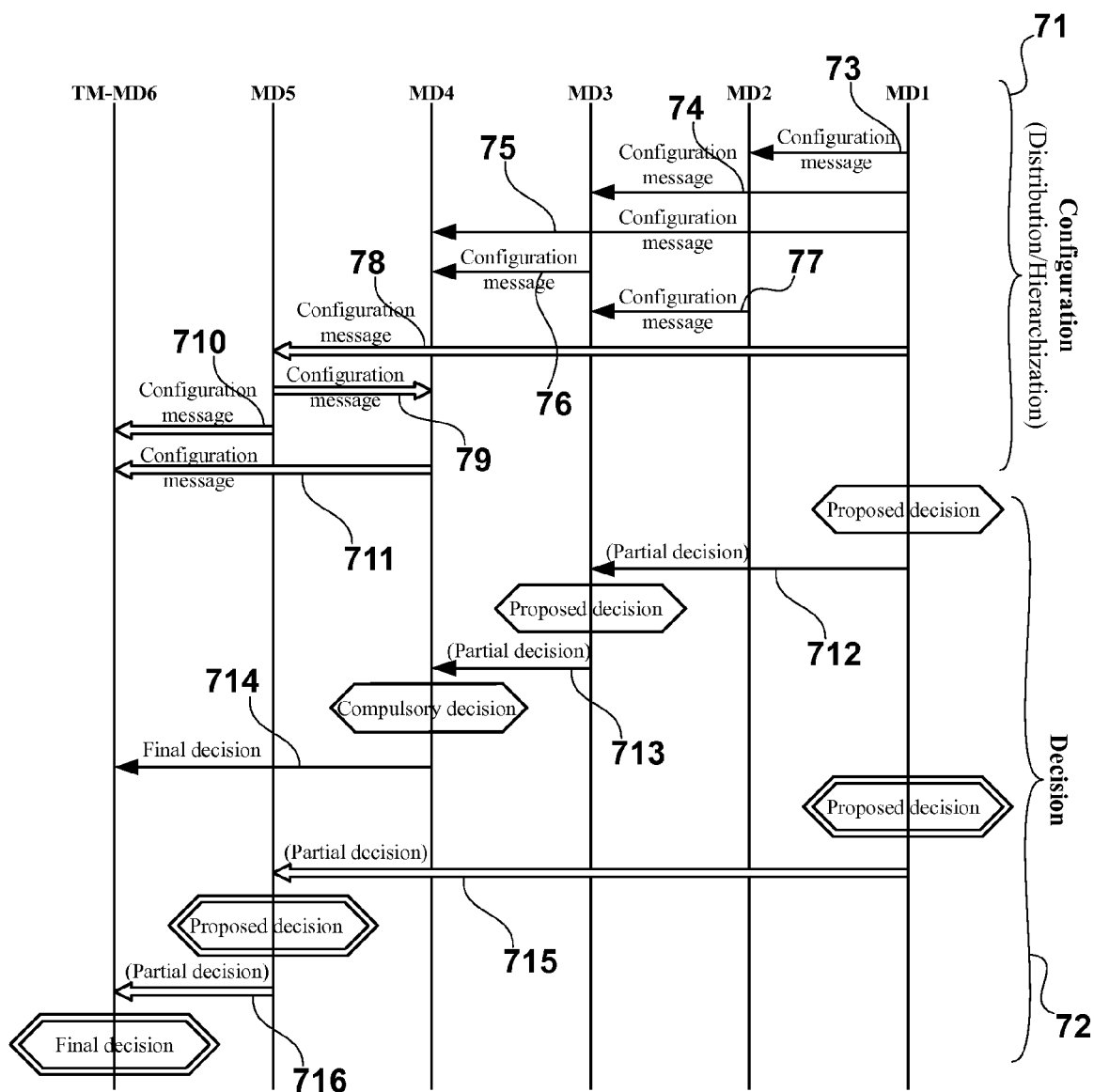
FIG. 7 illustrates an example of a sequence of configuration and decision messages between decision modules according to an embodiment of the invention.

FIG. 7 shows a possible exchange of messages between the different decision modules in the case of a terminal TM and two streams already discussed here above with reference to FIG. 3 (for the possible decision graphs for each of the streams) and FIG. 5 (for the active decision graph for each of the streams). For greater clarity in FIG. 7, the two functions, namely the configuration function 71 and decision function 72 are separated but actually the messages corresponding to each function may be interposed.

The configuration messages for the first stream are referenced 73 to 77 and are shown in single lines; they involve the decision modules referenced MD1, MD2, MD3 and MD4. The configuration messages for the second stream are referenced 78 to 711 and are shown in double lines; they involve the decision modules referenced MD1, MD4, MD5 and MD6.

The decision modules for the first stream are referenced 712 to 714 and shown in single lines; they involve the decision modules referenced MD1, MD3, MD4 and MD6. The decision modules for the second stream are referenced 715 and 716 and are shown in double lines; they involve the decision modules referenced MD1, MD5 and MD6.

2) DETAILED DESCRIPTION OF A PARTICULAR EMBODIMENT IN THE CASE OF MOBILITY MANAGEMENT

In the example shown here below with reference to FIGS. 8 and 9, an embodiment of the invention can be applied to manage the mobility of the user applications using mobile terminals. We consider, by way of an example, the management of mobility in the case of two streams assigned to a terminal: the first stream corresponds for example to an email application and the second stream to a video-on-demand (VoD) application.

Figure 8:
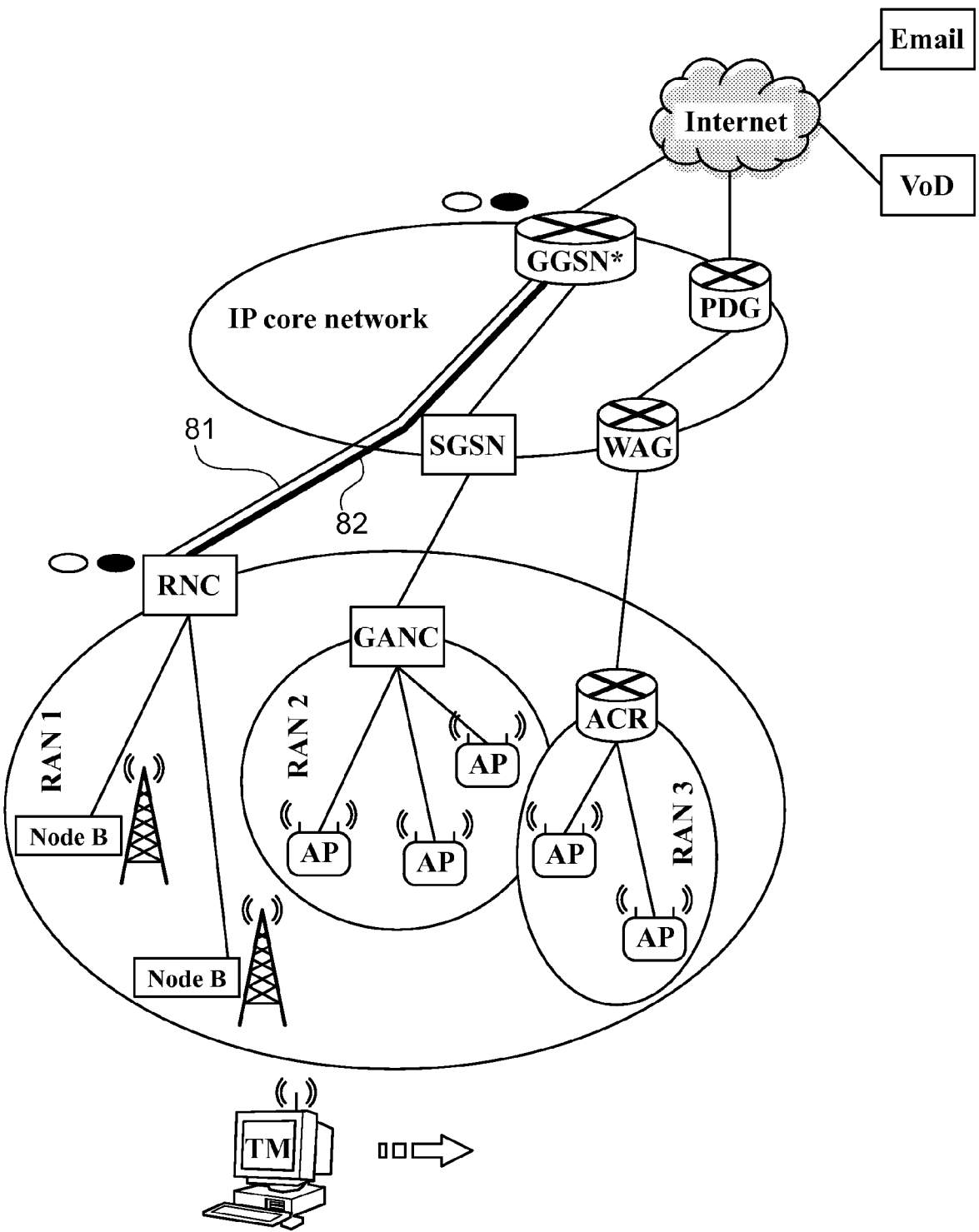
FIG. 8 is an example of initial (possible and active) decision graphs for two streams towards a single terminal, in the case of a management of mobility of the applications of the user of the terminal according to an embodiment of the invention.

Even though it is not limited to this case, an embodiment of the invention achieves its full scope in an architecture implementing several access networks as shown in FIG. 8.

Figure 9:
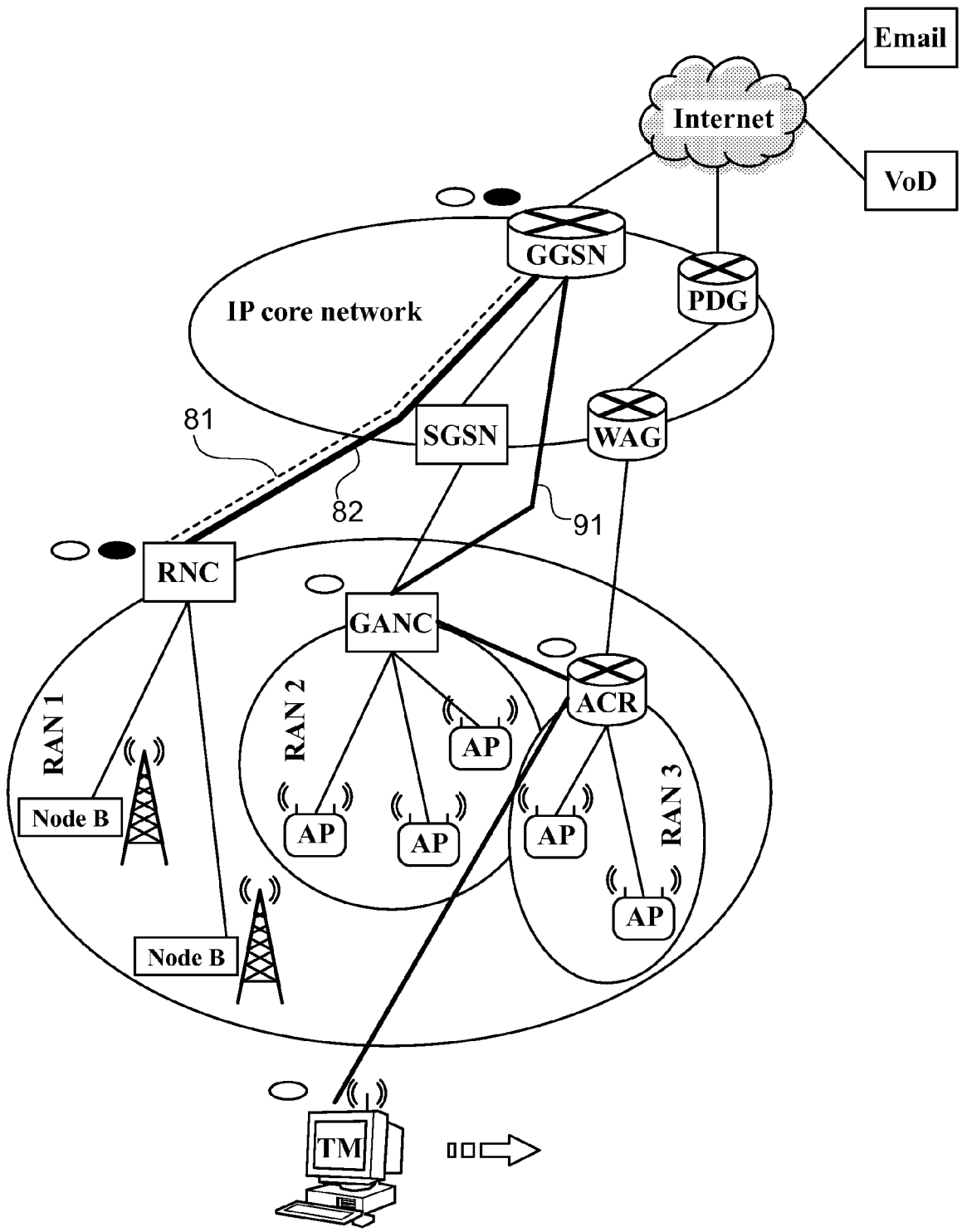
FIG. 9 is an example of (possible and active) decision graphs after a shifting of the terminal (relatively to the situation of FIG. 8), for two streams to a single terminal, in the case of a management of mobility of the applications of the user of the terminal, according to an embodiment of the invention.

In FIGS. 8 and 9, when a possible decision graph and an active decision graph are taken to be the same for a given stream, only the active decision graph appears.

Furthermore, in FIGS. 8 and 9 and here below in the description, the following abbreviations are used: ACR (Access Controller Router), AP (Access Point), GANC (Generic Access Network Controller), GGSN (GPRS Support Gateway), MD (Decision Module), PDG (Packet Data Gateway), RAN (Radio Access Network), RNC (Radio Controller Network), SGSN (GPRS Server Node), TM (Mobile Terminal), VoD (Video on demand) and WAG (WLAN Gateway).

The first step consists of the mutual recognition of the communications apparatuses comprising a decision module that can take part in the decision. It is assumed that this is pre-defined, i.e. that all the possible decision modules are known.

The second step consists in configuring the decision modules and preparing the possible and active decision graphs for the applications that start.

Through an embodiment of the invention, configuration messages are exchanged between the different entities (GGSN (GPRS Support Gateway) and RNC (Radio Network Controller) in this example) to end with the possible decision graphs of FIG. 8.

In this example, the two possible and active graphs are the same and are identical for both applications. They pass through the GGSN and the RNC. The active decision graph 82 for the first stream (email application) is shown in a thick solid line while the graph 81 for the second stream (video-on-demand application) is shown in a thin solid line.

Following this second step, the GGSN is configured in such a way that it will take a partial decision for each of the two declared applications, email and VoD, in taking account of parameters such as: the available credit, access rights, the need for security of the applications and the user preferences in term of cost.

This partial decision will be sent to the RNC through a decision message defined by an embodiment of the invention. Similarly, the RNC is configured in such way that it will take the final decision for each of the two applications declared, namely email and VoD, in taking account of parameters such as: the load of the nodes B. The RNC will send the terminal its final decision for both applications in choosing the node B on the network RAN1 (again through the decision message defined by an embodiment of the invention). Thus, the two applications could be managed in agreement with the decision graphs set up by the GGSN and the RNC.

In FIGS. 8 and 9, the decision modules of the entities forming part of the decision graphs for the email application are represented by black oval symbols and the decision modules of the entities forming part of the decision graphs for the VoD application are represented by blank oval symbols.

When the terminal is going to move, it will detect two new access points belonging to two new access networks: RAN2 (managed by the operator of the RAN1) and RAN3 (managed by another operator). The terminal will then inform the GGSN about this. The GGSN reconsiders the possibility of creating different decision graphs.

With regard to the email application which requires high security, it decides not to modify the graph. It sends the terminal a final decision message to this effect (104, FIG. 10).

For the application of VoD, the GGSN informs the GANC (Generic Access Network Controller), in a configuration message (101, FIG. 10), of the possibility of exchanging information with the ACR (Access Controller Router). It also tells it to take account of the user preferences in term of cost. The GGSN also tells the ACR in a configuration message (102, FIG. 10), that it can exchange information with the GANC. The GGSN also sends a configuration message (103, FIG. 10) to the terminal to inform it that it must take a final decision on the basis of a partial decision that it will have received beforehand. All these messages are the configuration messages defined by an embodiment of the invention.

In a partial decision message (105, FIG. 10), the GGSN tells the GANC (RAN2) to switch the application from VoD to RAN2; this is a partial decision. The GANC takes a partial decision in taking account of the following parameters: the user's preferences in terms of cost and the load of its access points. Now its access points are heavily loaded and it decides to give a partial decision to the ACR of the RAN3 in a partial decision message (106, FIG. 10) telling it to cause the application to pass from VoD to RAN3.

The ACR takes a partial decision in taking account of the following parameters: the load of its access points. The ACR then sends a partial handover decision of the VoD application to the terminal, in a decision message (107, FIG. 10).

It is the terminal that will take the final decision in taking account of the following parameters: the quality of the radio signal on the APs of the RAN3. The terminal will then make the handover to the RAN3 for the application VoD.

The new decision graphs (possible and active) are represented in FIG. 9.

The active decision graph 82 for the first stream (email application) shown in a thick solid line is unchanged relative to FIG. 8 and remains indistinguishable from the possible decision graph or graphs for this first stream. It involves the GGSN and the RNC.

The new active decision graph 91 for the second stream (VoD application) shown in a thin unbroken line is different from the previous one (referenced 81 and shown in a dotted line in FIG. 9). It involves the GGSN, the GANC, the ACR and the terminal TM. In this example, the new active decision graph 91 is indistinguishable from the new possible decision graph or graphs.

This example of an implementation clearly shows that the decision graphs (possible and active) are built dynamically for each application of each terminal. This example also shows the economy in terms of signalling achieved by preventing the transfer of parameters between the entities (this is the case of the load of the GANC for example).

Figure 10:
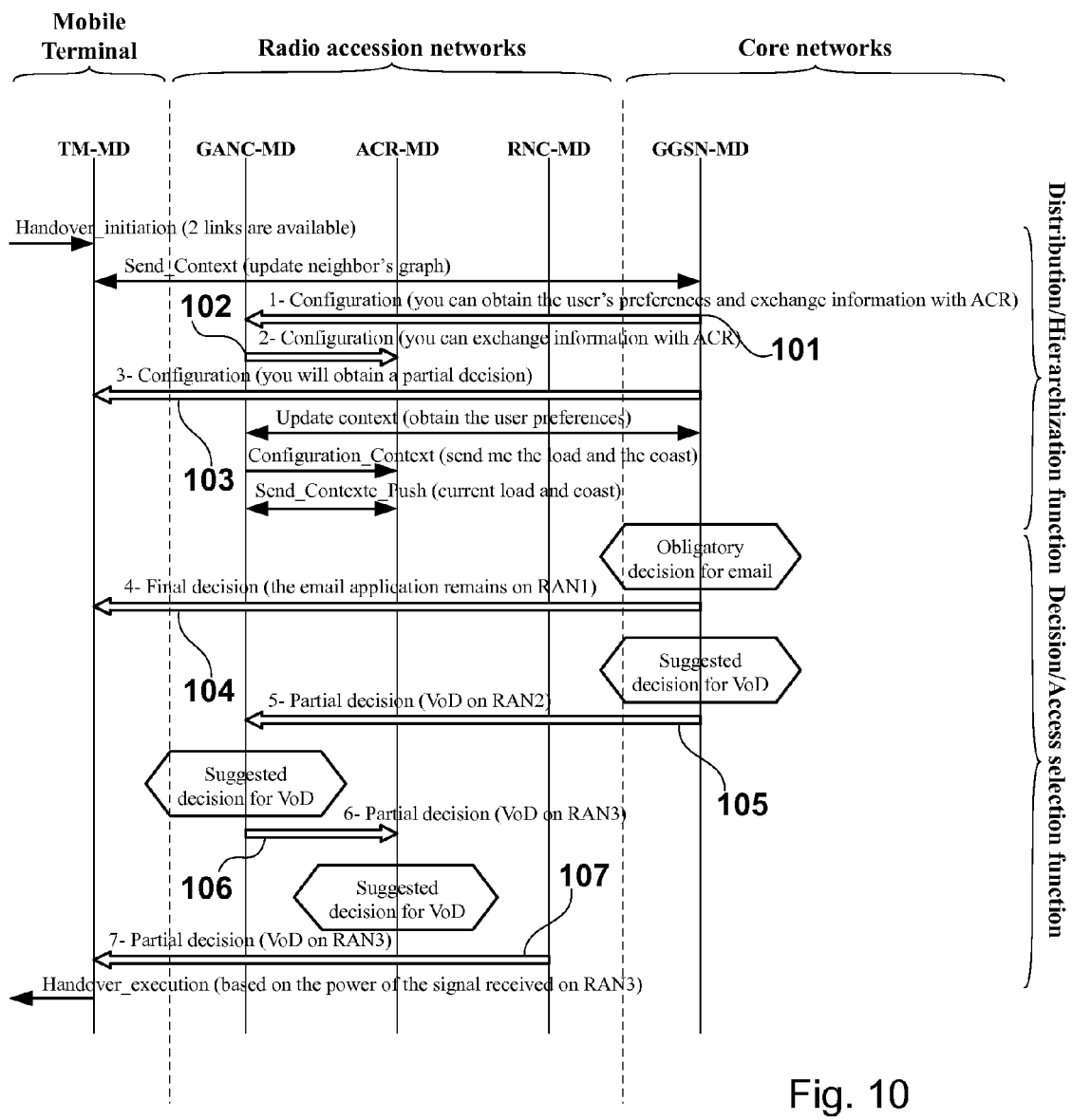
FIG. 10 illustrates an example of a sequence of messages of a complete decision-making process corresponding to the case of FIG. 9, in which the configuration and decision messages of an embodiment of the invention are integrated.

Finally, the message sequence diagram of FIG. 10 shows the way in which the new messages defined by an embodiment of the invention (shown in double lines) can be integrated into a complete decision-making process (the case of FIG. 9). The configuration messages are referenced 101 to 103 and the decision messages a referenced 104 to 107.

Appendix 1 gives a detailed description of an exemplary embodiment of the following messages:
 the configuration message (101) sent by the GGSN-MD to the GANC-MD;
 the configuration message (102) sent by the GANC-MD to the ACR-MD; and
 the decision message (107) sent by the ACR-MD to the terminal TM-MD.

Figure 11:
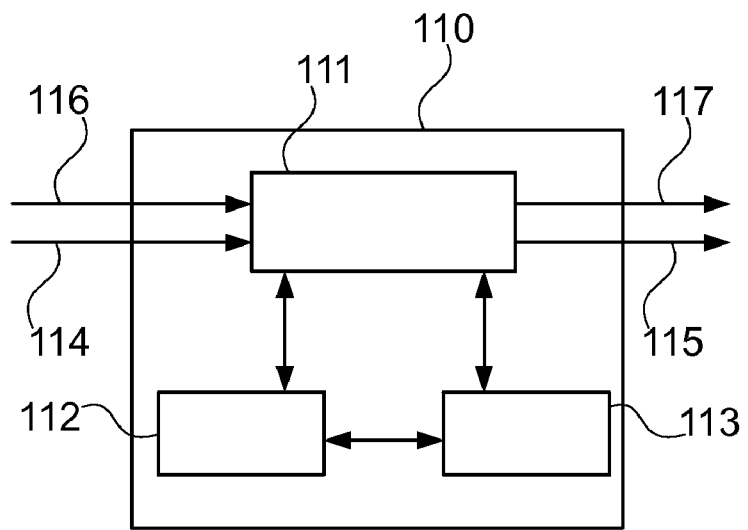
FIG. 11 shows the structure of communications equipment according to a particular embodiment of the invention, integrating a decision module capable of sending and/or processing configuration messages and/or decision messages.

FIG. 11 shows a simplified structure of a communications apparatus 110 according to a particular embodiment of the invention, integrating a decision module capable of sending and/or processing configuration messages and/or decision messages according to at least one embodiment (for example the embodiment shown here above with reference to FIGS. 8 and 9) of the method according to the invention for building at least one decision graph for the management of at least one applications stream assigned to a terminal.

This equipment is for example the GGSN, the RNC, the GANC, the ACR or the terminal TM of FIGS. 8 and 9.

It has a memory 113, a processing unit 111, equipped for example with a microprocessor and driven by a computer program 112 for sending and/or processing configuration messages and/or decision messages according to an embodiment of the invention.

At initialization, the instructions of the computer program code 112 are for example loaded into a RAM and then executed by the processor of the processing unit 111 in order to:

generate a configuration message 115 and send it to another apparatus comprising a decision module; and/or process a configuration message 114 coming from another apparatus comprising a decision module (and possible generate another configuration message 115 and transmit it to another apparatus comprising a decision module); and/or generate a decision message 117 and transmit it to another apparatus comprising a decision module; and/or process a decision message 116 coming from another apparatus comprising a decision module (and possible generate another decision message 117 and send it to another apparatus comprising a decision module).

In the above-mentioned case in which an embodiment of the invention is partially or totally implanted in software form, in each apparatus comprising a decision module capable of participating in the dynamic construction of possible and active decision graphs, the corresponding sequence of instructions can be stored in a detachable storage means (such as for example a floppy, a CD-ROM or a DVD-ROM) or in a non-detachable storage means, this storage means being partially or totally readable by a computer or a microprocessor.

3) APPENDIX 1

Example of Configuration and Decision Messages 3-1) Configuration message (101) GGSN-MD->GANC-MD
   Address of the source MD (decision module): IP GGSN Address
   Address of the destination MD: IP GANC address
   Identification of the pair: (MAC identifier, stream identifier)
   Two distribution structures in this case:
   Address of the third-party MD: IP GGSN address
   Role of the MD: Hierarchical
   Character of the distribution method: default
   Character of the decision method: suggested
   Decision Method: utility function
   Granularity supported: by stream
   Parameter defining the decision method: a=3
   Parameter of the decision method:
     Name of the parameter: user profile
     Address of the module containing this parameter: IP GGSN address
   Address of the third-party MD: IP ACR address
   Role of the MD: Pair
   Character of the distribution method: obligatory
   Distribution method: conflict free
   Character of the decision method: suggested
   Decision method: utility function
   Granularity supported: by stream
   Parameter defining the decision method: a=2
   Parameter of the decision method
     Name of the parameter: cost
     Address of the module containing this parameter: IP ACR address 3-2) Configuration Message (102) GANC-MD->ACR-MD
   Addresses of the source MD: IP GANC address
   Address of the destination MD: IP ACR address
   Identification of the pair: (MAC identifier, all the streams)
   A distribution structure in this case:
   Address of the third-party MD: IP GANC address
   Role of the MD: Pair
   Character of the distribution method: obligatory
   Distribution method: conflict free
   Character of the decision method: by default
   Granularity supported: by stream 3-3) Decision Message (107) ACR-MD->TM-MD
   Addresses of the source MD: IP ACR address
   Address of the destination MD: IP TM address
   Type of decision: partial
   Identification of the pair: (MAC identifier, stream identifier (VoD))
   Decision: handover (AP identifier (access point); RAN3 identifier)

4) APPENDIX 2

Example of Triggers and Parameters Capable of Entering the Mobility Decision 4-1) Examples of Parameters
Description profile of the terminal:
   Network card available and associated quality of service
   Multi-access support
Description profile of the streams:
   Identifier of the streams for the applications in progress
   Type of stream (adaptive or not adaptive)
   Class of stream (conversational, interactive etc)
   Minimal quality of service (band-width, delay, jitter, error rate etc)
User profile:
   Identifier, Access network preferred by application
   Access network prohibited by application
   Cost vs quality preference
   Security level per application
   Priority per application
Operator profile:
   Network preferred by user and by application
   Network prohibited by user and by application
   List of networks with which an agreement has been made
   Priority by application
   Load distribution preference
Access Network Profile:
   Identifier
   Load
   Level of signal per terminal
   Quality of signal per terminal
   Monetary cost
   Security level
   Available quality of service
   Typical quality of service
4-2) Examples of Triggers
Congestion
Decongestion
Launching an application
Variation of a quality of service parameter
Imminent coverage loss
Discovery of a new point of access
Diminishing the perceived quality
Modification of a user profile Modification of a operator policy Although the present disclosure has been described with reference to one or more examples, workers skilled in the art will recognize that changes may be made in form and detail without departing from the scope of the disclosure and/or the appended claims.

The invention claimed is:

1. A method for building at least two decision graphs for management of at least one applicative stream assigned to a terminal and set up between said terminal and a correspondent through at least one communications network, wherein said method comprises:
a step of dynamically building, with a communications apparatus, at least one possible decision graph for said at least one applicative stream assigned to said terminal itself, said step being performed at least two times and comprising a step of exchanging at least one configuration message between at least two decision modules belonging to a determined set of decision modules.

2. The method according to claim 1, wherein each configuration message comprises the following fields:
a field containing an identifier of the decision module that is a source of said configuration message;
a field containing an identifier of the decision module that is a recipient of said configuration message;
a field containing an identifier of at least said terminal, for which said configuration message can be applied;
a field containing at least one distribution structure.

3. The method according to claim 2, wherein each distribution structure comprises the following fields:
a field containing an identifier of a third-party decision module, distinct from said recipient decision module;
a field containing a role of said third-party decision module;
a field containing a character of a distribution method to be used between the recipient decision module and said third-party decision module;
a field containing a character of a decision method to be used by the recipient decision module.

4. The method according to 2, wherein each distribution structure furthermore comprises at least one additional field belonging to the group comprising:
a field containing a supported granularity;
a field containing a distribution method to be used between the recipient decision module and said third-party decision module;
a field containing at least one parameter defining said distribution method;
a field containing a decision method to be used by the recipient decision module;
a field containing at least one parameter defining said decision method.

5. The method according to claim 2, wherein each configuration message furthermore comprises an additional field containing at least one trigger structure for triggering a decision method to be used by the recipient decision module.

6. The method according to claim 5, wherein each trigger structure comprises the following fields:
a field containing an identifier of a given trigger;
a field containing an identifier of the decision module containing the given trigger.

7. The method according to claim 2, wherein each configuration message furthermore comprises an additional field containing at least one structure of decision parameters to be used by the recipient decision module, each structure of parameters comprising the following fields:
a field containing an identifier of a given parameter;
a field containing an identifier of the decision module containing the given parameter;
a field containing an identifier of the decision module that is the recipient of the given parameter;
a field containing a frequency of sending the given parameter.

8. The method according to claim 1, wherein each configuration message is specific to a terminal and to an applicative stream.

9. The method according to claim 1, furthermore comprising a step of dynamic building of a single active decision graph for said at least one applicative stream assigned to said terminal, itself comprising a step of exchanging at least one decision message between at least two decision modules, in complying with a configuration preliminarily created by the step of dynamic building of at least one possible decision graph, said single active decision graph being the possible decision graph or one of the possible decision graphs preliminarily built for said at least one applicative stream.

10. The method according to claim 9, wherein each decision message comprises the following fields:
a field containing an identifier of a source decision module of said decision message;
a field containing an identifier of the decision module that is a recipient of said decision message;
a field containing a type of decision that is partial or final;
a field containing an identifier of at least said terminal, for which said decision message is applied;
a field containing a decision.

11. The method according to claim 9, wherein each decision message is specific to a terminal and an applicative stream.

12. The method according to claim 1, furthermore comprising a preliminary step of obtaining a general decision graph comprising said determined set of decision modules from among which the decision modules exchanging the configuration messages are chosen.

13. The method according to claim 1, wherein said determined set of decision modules belong to a network architecture that is:
distributed because at least two decision modules belong to a same hierarchical level of said architecture and/or
hierarchized because at least two decision modules belong to two distinct hierarchical levels of said architecture.

14. The method according to claim 1, wherein the management of said at least one applicative stream assigned to said terminal belongs to the group comprising:
mobility management;
management of distribution of quality of services resources.

15. A communications equipment comprising:
a memory;
a processing unit;
a decision module; and
first means for exchanging, enabling an exchange of at least one configuration message with at least one other decision module belonging to a determined set of decision modules, so as to participate in a dynamic building of at least two possible decision graphs for management of at least one applicative stream assigned to a terminal and set up between said terminal and one correspondent through at least one communications network.

16. The communications equipment according to claim 15 furthermore comprising second means for exchanging, enabling an exchange of at least one decision message with at least one other decision module belonging to said determined set of decision modules, in keeping with at least one possible predetermined decision graph, so as to participate in a dynamic building of a single active decision graph for said at least one dedicated stream assigned to said terminal.

17. The communications equipment according to claim 15, wherein the equipment belongs to the group comprising:
   said terminal,
   said correspondent,
   entities of said at least one communications network.

18. A non-transitory computer-readable storage medium storing a computer program comprising program code instructions executable by a computer in order to implement a method for building at least two decision graphs for management of at least one applicative stream assigned to a terminal and set up between said terminal and a correspondent through at least one communications network, wherein said method comprises:
   a step of dynamically building at least one possible decision graph for said at least one applicative stream assigned to said terminal itself, said step being performed at least two times, and comprising a step of exchanging at least one configuration message between at least two decision modules belonging to a determined set of decision modules.

19. A method comprising:
generating, with a communications apparatus, a signal to be exchanged between a source decision module and a recipient decision module, in a context of a dynamic building of at least two possible decision graphs for management of at least one applicative stream assigned to a terminal and set up between said terminal and one correspondent through at least one communications network, said signal carrying a configuration message comprising:
   a field containing an identifier of said source decision module of said configuration message;
   a field containing an identifier of said decision module that is the recipient of said configuration message;
   a field containing an identifier of at least said terminal, for which said configuration message is applied;
   a field containing at least one distribution structure, and
transmitting the signal from the source decision module.

20. A method comprising:
generating, with a communications apparatus, a signal to be exchanged between a source decision module and a recipient decision module, in a context of a dynamic building of a single active decision graph for management of at least one applicative stream assigned to a terminal and set up between said terminal and one correspondent through at least one communications network, said signal carrying a decision message comprising:
   a field containing an identifier of said decision module that is the source of said configuration message;
   a field containing an identifier of said decision module that is the recipient of said configuration message;
   a field containing a type of decision that is partial or final;
   a field containing an identifier of at least said terminal, for which said configuration message is applicable;
   a field containing at least one distribution structure,
transmitting the signal from the source decision module.

* * * * *